United States Patent
Kleve et al.

(10) Patent No.: US 8,981,916 B2
(45) Date of Patent: Mar. 17, 2015

(54) METHOD AND APPARATUS FOR CUSTOMIZED VEHICLE SOUND-BASED LOCATION

(71) Applicant: Ford Global Technologies, LLC, Dearborn, MI (US)

(72) Inventors: Robert Bruce Kleve, Farmington, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 133 days.

(21) Appl. No.: 13/751,364

(22) Filed: Jan. 28, 2013

(65) Prior Publication Data

US 2014/0210649 A1   Jul. 31, 2014

(51) Int. Cl.
  B60Q 1/00   (2006.01)
  B60Q 5/00   (2006.01)
  G08G 1/005   (2006.01)
  G08G 1/00   (2006.01)

(52) U.S. Cl.
  CPC  B60Q 5/00 (2013.01); G08G 1/005 (2013.01); G08G 1/205 (2013.01)
  USPC .................. 340/425.5; 340/539.21; 340/989; 342/457; 455/414.2

(58) Field of Classification Search
  USPC ................ 340/989, 8.1, 5.72, 425.5, 539.21; 455/573, 574, 414.1, 414.2; 342/457
  See application file for complete search history.

(56) References Cited

U.S. PATENT DOCUMENTS

| | | | |
|---|---|---|---|
| 3,416,129 A * | 12/1968 | Dean | 340/436 |
| 4,797,671 A * | 1/1989 | Toal, Jr. | 340/8.1 |
| 6,366,202 B1 | 4/2002 | Rosenthal | |
| 6,526,335 B1 | 2/2003 | Treyz et al. | |
| 6,573,833 B1 | 6/2003 | Rosenthal | |
| 7,047,117 B2 | 5/2006 | Akiyama et al. | |
| 7,207,041 B2 | 4/2007 | Elson et al. | |
| 7,266,435 B2 | 9/2007 | Wang et al. | |
| 7,474,208 B1 * | 1/2009 | Klein | 340/539.21 |
| 7,505,784 B2 | 3/2009 | Barbera | |
| 7,602,782 B2 | 10/2009 | Doviak et al. | |
| 7,801,941 B2 | 9/2010 | Conneely et al. | |
| 8,121,802 B2 | 2/2012 | Grider et al. | |
| 8,131,458 B1 | 3/2012 | Zilka | |
| 2002/0098853 A1 | 7/2002 | Chrumka | |
| 2003/0079123 A1 | 4/2003 | Mas Ribes | |
| 2003/0147534 A1 | 8/2003 | Ablay et al. | |
| 2004/0203660 A1 | 10/2004 | Tibrewal et al. | |
| 2004/0260438 A1 | 12/2004 | Chernetsky et al. | |
| 2004/0267585 A1 | 12/2004 | Anderson et al. | |
| 2005/0091408 A1 | 4/2005 | Parupudi et al. | |
| 2005/0177635 A1 | 8/2005 | Schmidt et al. | |

(Continued)

OTHER PUBLICATIONS

European Patent Office.

(Continued)

*Primary Examiner* — Brent Swarthout
(74) *Attorney, Agent, or Firm* — Jennifer M. Stec; Brooks Kushman P.C.

(57) ABSTRACT

A system includes a vehicle-based processor configured to receive a wireless vehicle-locate request from a remote device. The processor is also configured to receive an instruction from the remote device relating to selection of an outputtable tone and output, through use of one or more external vehicle sound systems, a selected tone in accordance with the instruction.

14 Claims, 6 Drawing Sheets

(56) References Cited

U.S. PATENT DOCUMENTS

| | | | |
|---|---|---|---|
| 2006/0150197 | A1 | 7/2006 | Werner |
| 2006/0156315 | A1 | 7/2006 | Wood et al. |
| 2006/0190097 | A1 | 8/2006 | Rubenstein |
| 2006/0287787 | A1 | 12/2006 | Engstrom et al. |
| 2006/0287821 | A1 | 12/2006 | Lin |
| 2007/0016362 | A1 | 1/2007 | Nelson |
| 2007/0042809 | A1 | 2/2007 | Angelhag |
| 2007/0042812 | A1 | 2/2007 | Basir |
| 2007/0050854 | A1 | 3/2007 | Cooperstein et al. |
| 2007/0069951 | A1* | 3/2007 | Sweet .......................... 342/457 |
| 2007/0132572 | A1 | 6/2007 | Itoh et al. |
| 2007/0294625 | A1 | 12/2007 | Rasin et al. |
| 2008/0086455 | A1 | 4/2008 | Meisels et al. |
| 2008/0148374 | A1 | 6/2008 | Spaur et al. |
| 2008/0220718 | A1 | 9/2008 | Sakamoto et al. |
| 2008/0313050 | A1 | 12/2008 | Basir |
| 2009/0010448 | A1 | 1/2009 | Voto et al. |
| 2009/0075624 | A1 | 3/2009 | Cox et al. |
| 2009/0106036 | A1 | 4/2009 | Tamura et al. |
| 2009/0117890 | A1 | 5/2009 | Jacobsen et al. |
| 2009/0140064 | A1 | 6/2009 | Schultz et al. |
| 2009/0156182 | A1 | 6/2009 | Jenkins et al. |
| 2009/0228908 | A1 | 9/2009 | Margis et al. |
| 2009/0253466 | A1 | 10/2009 | Saito et al. |
| 2009/0318119 | A1 | 12/2009 | Basir |
| 2010/0063670 | A1 | 3/2010 | Brzezinski et al. |
| 2010/0094996 | A1 | 4/2010 | Samaha |
| 2010/0098853 | A1 | 4/2010 | Hoffmann et al. |
| 2010/0157061 | A1 | 6/2010 | Katsman et al. |
| 2010/0216509 | A1 | 8/2010 | Riemer et al. |
| 2010/0234071 | A1 | 9/2010 | Shabtay et al. |
| 2010/0306309 | A1 | 12/2010 | Santori et al. |
| 2011/0066365 | A1* | 3/2011 | Khawand ....................... 701/201 |
| 2011/0087385 | A1 | 4/2011 | Bowden et al. |
| 2011/0105097 | A1 | 5/2011 | Tadayon et al. |
| 2011/0110530 | A1 | 5/2011 | Kimura |
| 2011/0112762 | A1 | 5/2011 | Gruijters et al. |
| 2011/0185390 | A1 | 7/2011 | Faenger et al. |
| 2011/0195659 | A1 | 8/2011 | Boll et al. |
| 2011/0275358 | A1 | 11/2011 | Faenger |
| 2011/0296037 | A1 | 12/2011 | Westra et al. |
| 2012/0054300 | A1 | 3/2012 | Marchwicki et al. |
| 2012/0064917 | A1 | 3/2012 | Jenkins et al. |
| 2012/0065815 | A1 | 3/2012 | Hess |
| 2012/0079002 | A1 | 3/2012 | Boll et al. |
| 2012/0084292 | A1 | 4/2012 | Liang et al. |
| 2013/0321143 | A1* | 12/2013 | Boyer .......................... 340/463 |
| 2014/0066135 | A1* | 3/2014 | Murray et al. ................ 455/574 |

OTHER PUBLICATIONS

International Search Report for the corresponding PCT/US2010/37052.

Korean Intellectual.

Ford Motor Company, "SYNC with Navigation System," Owner's Guide Supplement, SYNC System Version 1 (Jul. 2007).

Ford Motor Company, "SYNC," Owners's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem," Automotive Design & Production, Oct. 2003, http://findarticles.com, pp. 103.

Service Discovery Protocol (SDP) Layer Tutorial, Palowireless Bluetooth Research Center, http://www.palowireless.com/infotooth/tutorial/sdp.asp. Aug. 3, 2010.

IPhone Hacks, Apple Files Patent Which Allow You to Control Your Computer Remotely Using IPhone, http://www.iphonehacks.com/2009/12/apple-files-patent-which-could-allow-you-to-control-your-computer-remotely-using-iphone, Jun. 22, 2010.

Zack Newmark, American, Concept Car, Ford, Gadgets, Lifestyle, Technology, Student develop in-car cloud computing apps; envision the future of in-car connectivity, May 4, 2010, http://ww.woldcarfans.com/print/110050425986/student-develop-in-car-cloud-computing_apps;_envision_the_future_of_in-car_connectivity.

Wikipedia, the free encyclopedia, X Window System, http://en.wikipedia.org/wiki/X_Window_System, Jun. 22, 2010.

Darryl Chantry, MSDN, Mapping Applications to the Cloud, 2010 Microsoft Corporation, Platform Architecture Team, Jan. 2009, http://msdn.microsoft.com/en-us/library/dd430340(printer).aspx, Jun. 18, 2010.

"MobileSafer is your personal safe driving assistant", 2010 ZoomSafer Inc. <http://zoomsafer.com/products/mobilesafer> Dec. 28, 2010.

"How PhonEnforcer Works" Turn off the Cellphone While Driving—PhonEnforcer. Turn off the Cell Phone LLC. <http://turnoffthecellphone.com/howitworks.htm> Dec. 28, 2010, pp. 1-3.

"PhonEnforcer FAQ's" Turn Off the Cellphone While Driving—PhonEnforcer. Turn off the Cell Phone LLC. <http://turnoffthecellphone.com/faq.html> Dec. 28, 2010, pp. 1-2.

Lamberti, Ralph "Daimler Full Circle: The Rise of Vehicle-Installed Telematics—Telematics Munich 2009" Nov. 10, 2009.v.

Narasimhan, et al., A lightweight remote display management protocol for mobile devices, Application Research Center, Motorola Labs Schaumburg, IL, 2007, pp. 711-715.

Voelcker, Top 10 Tech Cars It's the Environment, Stupid, www.spectrum.ieee.org, Apr. 2008, pp. 26-35.

Yarden, et al., TUKI: A Voice-Activated Information Browser, IEEE, 2009, pp. 1-5.

Gil-Castineira, et al., Integration of Nomadic Devices with Automotive User Interfaces, IEEE Transactions on Consumer Electronics, vol. 55, No. 1, Feb. 2009.

Nusser, et al., Bluetooth-based Wireless Connectivity in an Automotive Environment, Robert Bosch GmbH, VTC 2000, pp. 1935-1942.

Antuan Goodwin, The Car Tech Blog, Ford Unveils open-source Sync developer platform, http://reviews.cnet.com/8301-13746_7-10385619-48.html, Oct. 2009, pp. 1-5.

\* cited by examiner

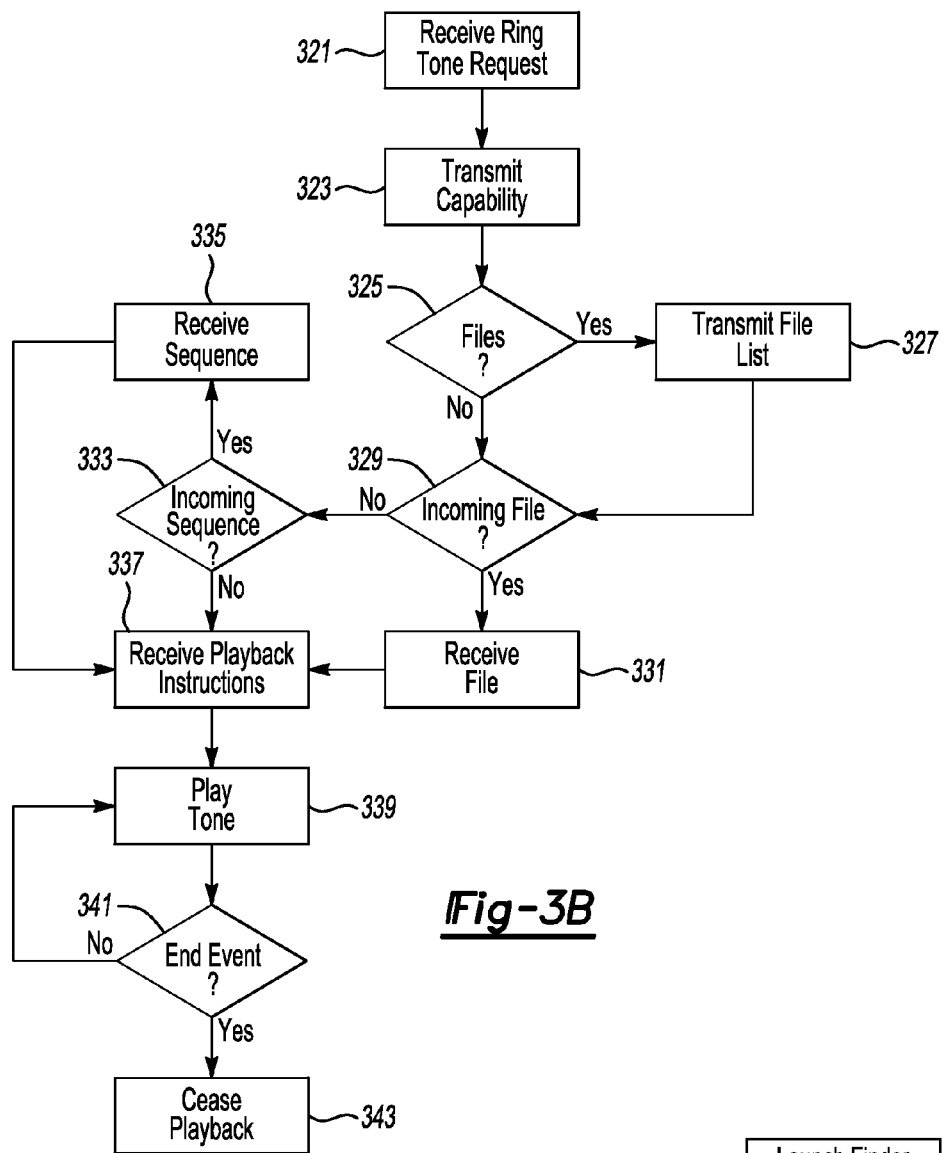
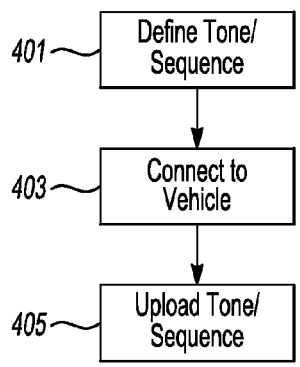
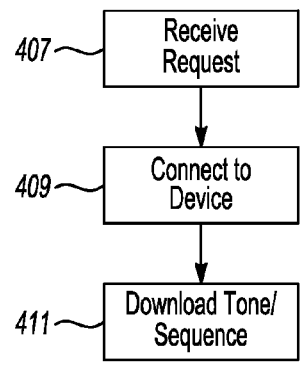
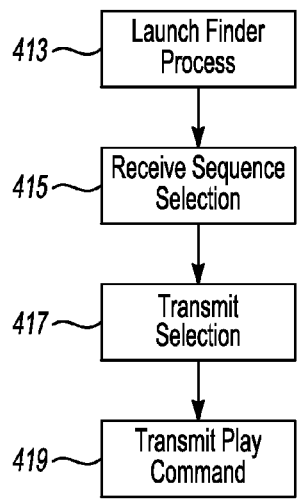
Fig-3B
Fig-4A
Fig-4B
Fig-4C

US 8,981,916 B2

METHOD AND APPARATUS FOR CUSTOMIZED VEHICLE SOUND-BASED LOCATION

TECHNICAL FIELD

The illustrative embodiments generally relate to a method and apparatus for customized vehicle sound-based location.

BACKGROUND

Since numerous users may be parked in a parking lot simultaneously, it may be difficult for a particular driver to find their vehicle upon exiting a store. In some cases, a car horn or alarm may be used, but since many horns and alarms sound similar, it can be difficult to distinguish between various vehicles.

Some attempts to change this experience include U.S. Ser. No. 09/653,388, which generally relates to a lost item finding system including at least two nearly identical locators. Either one can be used to find the other and whatever items are attached to it. The available locator broadcast to the lost one an acoustic search signal including a sequence of tones having predetermined frequency differences between them. The lost locator determines the baseline frequency and then identifies whether the signal conforms to the predetermined tone sequence and then transmits a beacon signal that can be perceived by the user as he searches for the lost item. The beacon signal may include both an audible signal and a flashing light emitting diode. Advantageously, both the transmission and reception of the audio signal is accomplished with one piezoelectric transducer, and the efficiency of the transducer is increased by forming a resonant cavity having a cap both protecting the piezoelectric transducer and forming an annular side port.

SUMMARY

In a first illustrative embodiment, a system includes a vehicle-based processor configured to receive a wireless vehicle-locate request from a remote device. The processor is also configured to receive an instruction from the remote device relating to selection of an outputtable tone and output, through use of one or more external vehicle sound systems, a selected tone in accordance with the instruction.

In a second illustrative embodiment, a computer-implemented method includes receiving a wireless vehicle-locate request from a remote device. The method also includes receiving an instruction from the remote device relating to selection of an outputtable tone and outputting, through use of one or more external vehicle sound systems, a selected tone in accordance with the instruction.

In a third illustrative embodiment, a non-transitory computer-readable storage medium, storing instruction that, when executed by a processor, cause the processor to perform a method including receiving a wireless vehicle-locate request from a remote device. The method also includes receiving an instruction from the remote device relating to selection of an outputtable tone and outputting, through use of one or more external vehicle sound systems, a selected tone in accordance with the instruction.

BRIEF DESCRIPTION OF THE DRAWINGS

FIGS. 3A and 3B show an illustrative process for another user-selected vehicle finding tone initiation;
FIGS. 4A-4D show an illustrative process for yet another user-selected vehicle finding tone initiation.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
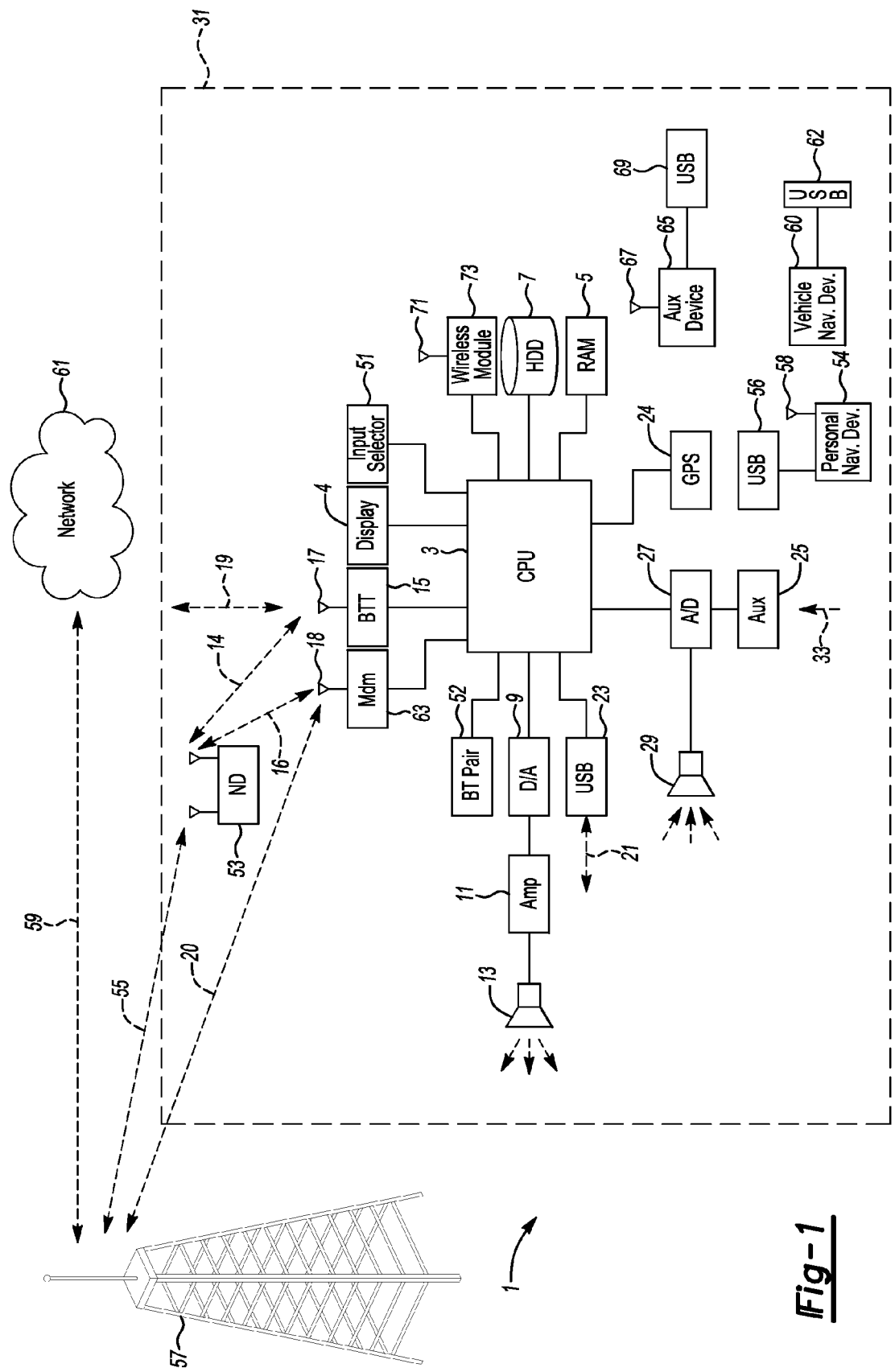
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Often times a driver is forced to park a vehicle in a large parking lot when entering a building such as at a shopping mall or even a grocery store. Of course a number of other shoppers may also be present, resulting in a large number of vehicles remaining in the lot while the drivers shop. Once the driver exits the store, the driver may not remember where the vehicle was last parked.

Currently, a common practice is to press the lock/unlock button on a fob to cause a vehicle's horn to beep or cause the vehicle's lights to flash. This is somewhat useful, but the since most vehicle horns sound similar, this can still result in some confusion as to whether or not a particular vehicle belongs to a particular user. Further, if a number of users are simultaneously attempting to find vehicles, the commonality of sound can result in confusion between the searching users.

Additionally, the current methods may require the user to repeatedly depress a button on the fob, which could be difficult if the user is carrying a number of packages. Further, there is not a correlation between the sounds and the distance from the vehicle in this common solution. Even in solutions where a visual display shows the distance/direction to a vehicle, the user must hold and maintain focus on the display in order to accurately utilize the visual directions.

Figure 2A:
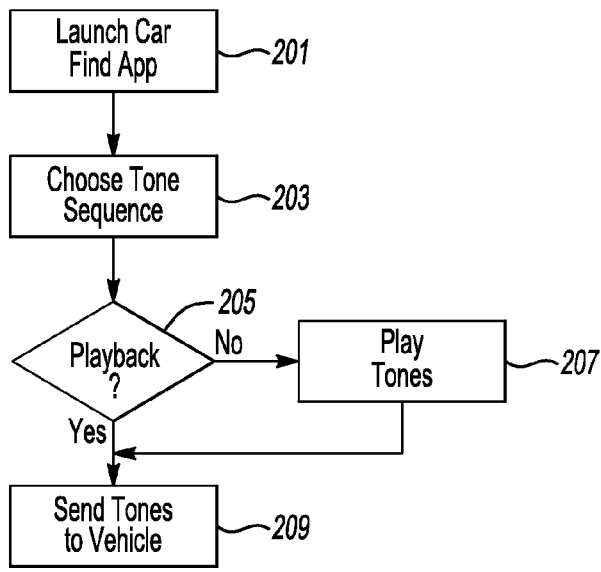
FIGS. 2A and 2B show an illustrative process for a user-selected vehicle finding tone initiation.
Figure 2B:
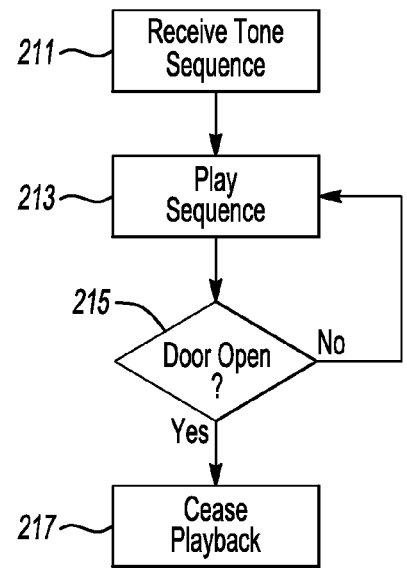

FIGS. 2A and 2B show an illustrative process for a user-selected vehicle finding tone initiation. In this illustrative example, an application running on the phone (or other portable device) is provided that presents a user with a number of selectable tones. For example, without limitation, a number of selectable buttons could be presented, each of which corresponds to a different tone. The user could then depress the buttons in a particular sequence to produce a desired musical sequence. This sequence is then sent to and played back by the vehicle in order to produce a custom set of tones that the user can easily identify as corresponding to his or her vehicle.

In FIG. 2A, the process is shown from a device-side perspective. As previously stated, the process may begin with the launching of a vehicle-finder application or subroutine of another application. This application is designed to communicate with a vehicle computing system over a distance and provide a user-designed tone to the vehicle for playback.

Once the application has been launched 201, the process presents the user with a plurality of selectable buttons that correspond to various tones. In this illustrative example, the tones can be developed on the spot by the user, but in other instances the tones may be pre-recorded by the user or even provided by an OEM or software provider. The tones correspond to tones playable by a vehicle system, so the vehicle would need to be equipped with sufficient playback capability to replicate more than one tone. In another example, even if the vehicle can only play a single tone, each button could correspond to varied tone timing, e.g., button 1—a single long honk, button 2—three short, staccato honks, et.

Once the user has developed or selected a tone sequence, the process may offer the user an opportunity to hear the tones playback as they should sound from the vehicle 205. This playback can assist the user in understanding how the selected tones will sound. If the user elects to hear the tones played-back locally on the device, the process can play back the tones 207 until the user is satisfied that the proper sequence is understood. Although not shown, the user could also have an option to re-select or re-record tones at this point if the user is dissatisfied with the current selection.

Once the user has completed selection and any local playback of tones on the device, the process sends the tones to the vehicle for playback 209. This can be done over a WiFi, BLUETOOTH, cellular, RF or other suitable wireless connection. The tones themselves don't necessarily need to be sent, as the vehicle may only need receive a sequencing command that contains the selected sequence of tones.

FIG. 2B shows an illustrative example of processing the tone inputs and playback from a vehicle-side perspective. In this illustrative example, a user has already selected and/or developed a tone sequence on the mobile device. Also, communication has been established between the vehicle computing system (or other onboard receiver) and the portable device, allowing transmission of the tones or sequence selections.

The tone sequence, any needed tones, and/or a preset tone sequence selection is received by the computing device 211. The system can then determine which tones to play back. In some cases, the system may be equipped with an exterior speaker capable of tone replication over a variety of ranges. In other cases, the system may utilize existing external audio (such as a horn) to play back notes with varied frequency. Once the computer has determined which tones to playback, the process plays back the sequence externally 213. In this embodiment, the playback, once initiated, continues until a door is opened 215. Other events could also terminate playback, including, but not limited to, key-on, unlock, an explicit terminate command, etc. Once the appropriate command or event occurs, the process terminates playback of the selected sequence 217.

Figure 3A:
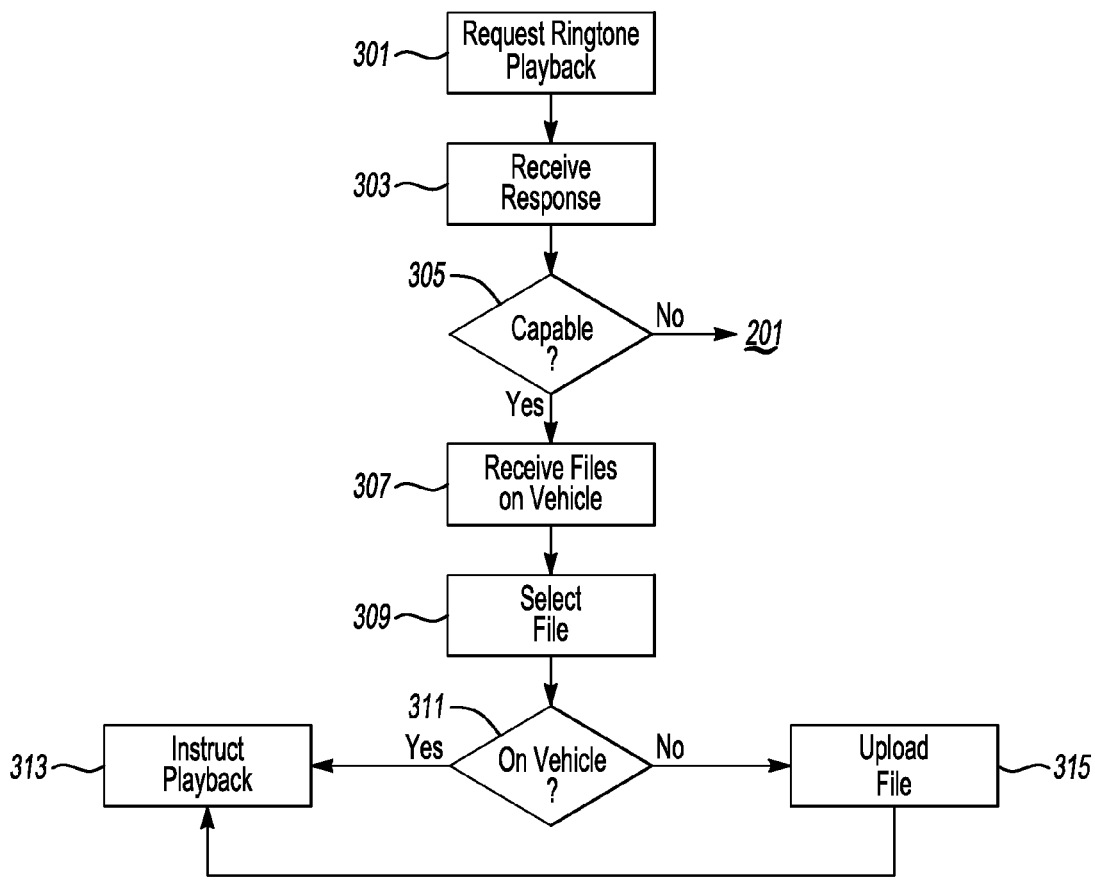

FIGS. 3A and 3B show an illustrative process for another user-selected vehicle finding tone initiation. In the previous example, the system played back a number of tones based on a user selected sequence, or based on a preset sequence. FIGS. 3A and 3B represent a potentially more varied playback possibility, wherein the vehicle is equipped with an external speaker capable of reproducing a music file, such as an MP3.

In this illustrative example, the user actually selects a song or other audio file to be repeated by the vehicle, providing a greater variance in the possible outputs and further customization of the playback.

FIG. 3A shows a device-side example of the process for audio selection and playback request. In this illustrative example, an application or routine may be executed on the remote device, allowing selection of and/or transfer of audio files. This application may be the same application used on other vehicles to playback the tones, and may present varied options based on a certain vehicle's capabilities. Since some vehicles may not be equipped with the proper output capability, the process (after connecting to the vehicle), requests playback of an audio file 301. A response is then received 303, indicating the capability of the vehicle.

If the vehicle is only capable of basic tone replication 305, the process may proceed with presenting the user with the tone selection functions described with respect to FIG. 2A. If, however, the vehicle is capable of advanced sound replication 305, the process may then receive a list of audio files already present on the vehicle 307.

If files have been pre-loaded onto the vehicle, the user may avoid the time required to transfer a file to the vehicle by presenting a list of the files for user selection. The list of files, however, can also include files that are present on the mobile device or that can be downloaded by the mobile device and/or the vehicle. These files may be present on the mobile device memory, or can be listed as available from a remote source, such as a server that can communicate with the vehicle and/or the mobile device.

The user can then select a file from the list presented (which may show distinctions between the various file locations, e.g., on-vehicle, on-device, downloadable, etc.) 309. The process may then determine if the file is already present on the vehicle 311 or if it needs to be downloaded and/or uploaded.

If the file is present on the vehicle 311, the process can merely instruct the vehicle to begin playback of the selected file 313. Alternatively, the process can download the file from a remote source, upload the file to the vehicle from the device 315, and/or instruct the vehicle to download the file from the remote source. Once the file is present on the vehicle, the playback process can begin 313.

FIG. 3B shows an illustrative example of the audio file playback process from a vehicle-side perspective. In this illustrative example, the vehicle receives a request to determine if the vehicle includes audio file playback capability 321. Responsive to this request, the process will transmit the capability of the particular vehicle to the requesting device 323.

Whether the system can playback specific audio files (such as MP3s) or merely replicate sequences using standard vehicle hardware, the process may determine if a number of files or sequences are presently stored in the vehicle memory 325. If these files exist, the process may transmit a file list 327 to the remote device in order to be presented to a user for selection or consideration. Additionally or alternatively, a remote file or sequence may be transmitted to the vehicle 329. If there is an incoming file 329 or incoming sequence 333, the process may receive and store the file or sequence respectively 331, 335.

Once the proper file/sequence is received or selection of a pre-stored file/sequence is made, the process may wait for a playback request. Once the playback instruction is received by the vehicle 337, the process begins playback of the tone/file 339 until an end event 341 is received. As with before, the end event can include, but is not limited to, door opening, proximity to device, explicit instruction, key-on, etc. Upon receipt of the appropriate end-event, the process terminates playback of the tones or file.

Figure 4D:
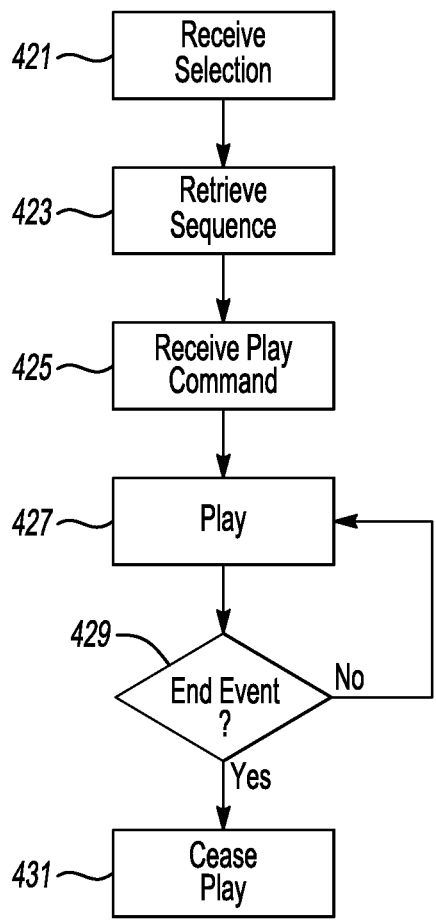

FIGS. 4A-4D show an illustrative process for yet another user-selected vehicle finding tone initiation. In this illustrative example, the tone (or audio file) has been preselected and uploaded at some point prior to the need for vehicle discovery. FIGS. 4A and 4B illustrate this portion of the process.

In FIG. 4A, the user defines a tone sequence, selects a tone sequence, or selects an audio file for use in discovering the vehicle 401. This process can be undertaken on a wireless device, or it can even be performed on a remote PC. Once the tone has been defined or selected, the process may connect to the vehicle 403 for uploading of the tones, sequence or audio file. The appropriate commands or files are then uploaded 405.

In some cases, although not shown, an identifier associated with the tone may be stored or uploaded to the wireless device as well. This provides for easy selection of the tone, sequence or file upon need. When the user requests vehicle discovery, the process can present known uploaded selections for user interaction, knowing that these files have already been properly presented to the vehicle.

FIG. 4B shows the uploading process from a vehicle-side perspective. In this embodiment, the vehicle computer receives a request to connect to the remote device or PC 407. Responsive to the request, the process connects to the appropriate remote device 409 and downloads/receives the tone, sequence or audio file as designated by a user. An identifier may also be received, so that the computer knows which file is selected when the file is designated by the wireless device in a find-vehicle request.

FIG. 4C shows the device-side perspective of the process when a find-vehicle request is implemented for a file that has been pre-defined. In this illustrative example, the device launches a find-vehicle process 413 and presents a number of possible tones/files for selection. These files correspond to files that have already been uploaded to the vehicle, so no upload of defined files is needed, nor is there a need to define a tone or file for playback.

Once a selection has been received 415, the process transmits the selection to the vehicle 417. Transmission of files and/or selections/requests to the vehicle can be accomplished through direct wireless communication with the vehicle. In other instances, a connection can be established to a remote server, which then can transfer the files or requests to the vehicle. The vehicle or the remote server can also serve to authenticate the device or user, to ensure that only requests from validated sources are implemented at the vehicle. in addition to transmitting the selection, a request to play back the selected file/tone is transmitted.

FIG. 4D shows an illustrative example of a playback process from a vehicle-side perspective. In this example, the vehicle receives the selection from the remote device 421. In this example, the selection corresponds to a file or tone that has been previously uploaded to the vehicle. The vehicle then retrieves the requested sequence or file from the vehicle memory 423.

Once a play command has been received 425, the vehicle computer can begin playback of the selected tone or file 427. In order to assist the user in minimizing interaction, the playback continues until a termination event has been detected 429. Once the termination event occurs, the process ceases playback of the selected tone or file.

Figure 5A:
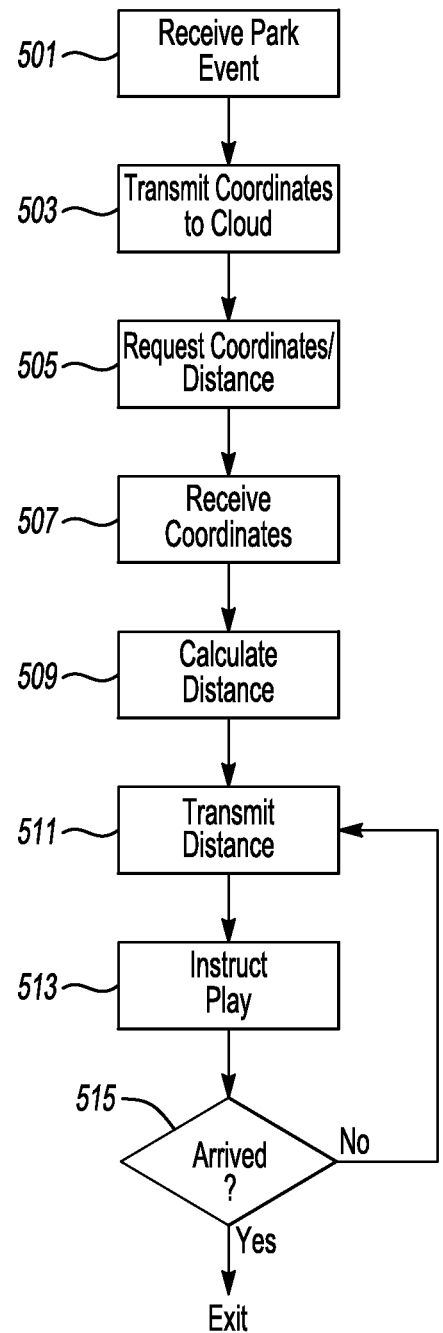
FIGS. 5A-5C show an illustrative process for a varied tone playback based on distance from vehicle.
Figure 5B:
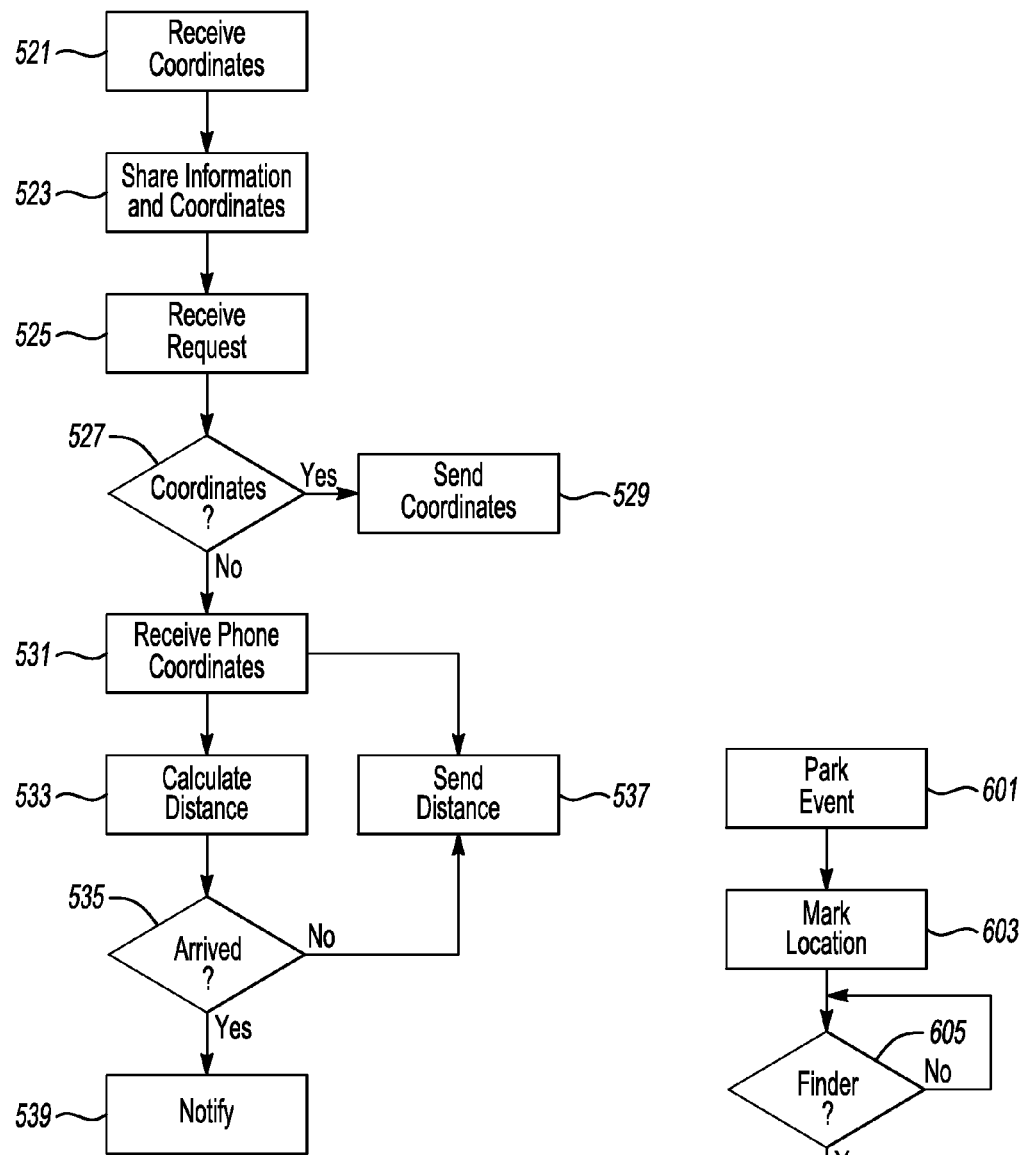
Figure 5C:
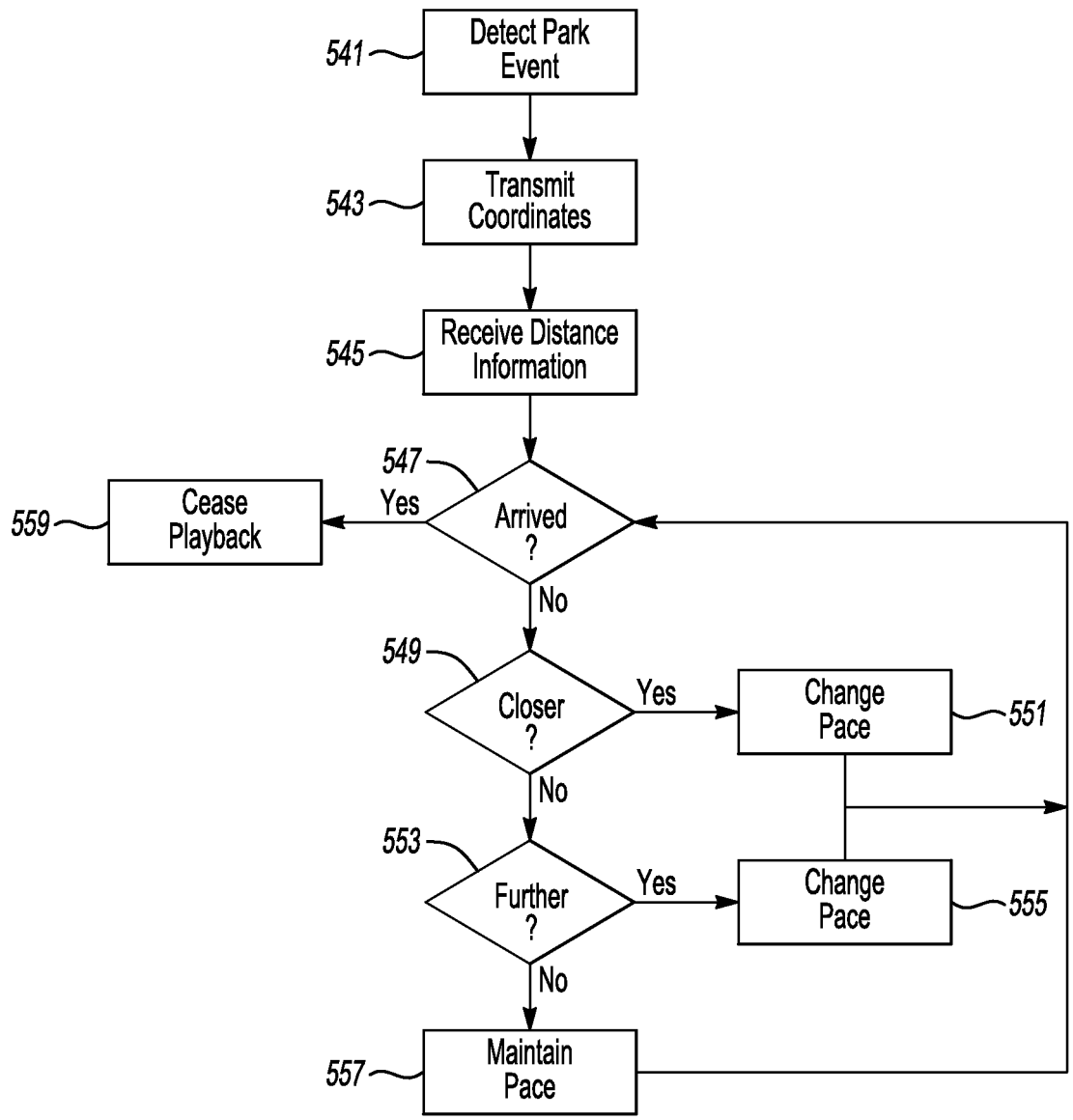

FIGS. 5A-5C show an illustrative process for a varied tone playback based on distance from vehicle. In this illustrative embodiment, a tone or tone sequence is used instead of an audio file. The tempo of the tone or frequency of repetition can increase as the user nears the vehicle and decrease if the user moves away from the vehicle.

In this illustrative example, a vehicle park event is first detected or received 501. FIG. 5A shows the process from a device-side perspective. The park event could include, but is not limited to, placing the vehicle in park, key off, door open and/or some combination of these events. In this example, the device is provided with a GPS module and is used to determine the location of the vehicle when the park event occurs. Accordingly, the device transmits the coordinates to a cloud-based server 503 for storage and later retrieval. In another embodiment, the process could locally store the coordinates.

At this point, the process is suspended until such time as the user needs to find the vehicle. Once the request has been initiated, the process requests the coordinates from the remote server 505. In another example, the process may retrieve the coordinates from local storage. The process may also desire to have the remote server perform a distance-from-vehicle calculation, and so could further transmit the coordinates of the device (representing the position of the user) to the remote server. In this example, the process itself calculates the distance to the vehicle, so repeated coordination with the remote server is not required.

The coordinates are received from the remote server 507 and the distance to the vehicle is calculated 509. The distance is effectively the distance between the parked-coordinates and the current coordinates of the device. This distance is then transmitted to the vehicle 511, so that the vehicle knows with what frequency to play back the tones. In addition, the process instructs the vehicle to play back the requested tones 513. Since the distance continues to vary as the user moves, the process may continue transmission of the changing distance 511 to the vehicle until the user arrives at (or sufficiently nears) the vehicle 515. At this point, transmission of the distance can cease.

FIG. 5B shows the process from a server-side perspective. Since the server may not know when the vehicle has parked, transmission of coordinates for storage represents a possible initiation event 521, which may also be accompanied by vehicle/user information to ensure proper storage of the coordinates and easy later retrieval. The received coordinates are then stored in the remote server for later retrieval by a user requesting vehicle find.

In this illustrative example, the remote server (as opposed to the phone) calculates the distance to the vehicle, based on updated and received phone coordinates. The process receives a request from the phone 525 to find the vehicle. If the phone merely requests coordinates (such as in a case where the phone will be performing the distance calculation) 527, the process will send the coordinates 529 and exit, since the coordinates may only be needed a single time in such an instance.

On the other hand, if the user/application desires to have the server perform the distance calculation, the process receives a set of coordinates from the phone 531. These received coordinates correspond to the current location of the phone, and can be used to determine the distance to the vehicle. Once the coordinates have been received, they can be compared to the coordinates stored with respect to the vehicle 533 to determine the separation between the two objects.

If the separation is below an arrival threshold 535, the process determines that the phone is proximate to the vehicle and notifies the vehicle and/or phone of the arrival so that cessation of the audio playback can occur. If, however, arrival has not been achieved, then the process can return the distance between the devices 537 to the phone (or to the vehicle) for use in determining a frequency of tone playback.

FIG. 5C shows an illustrative example of a distance-varied playback process from a vehicle-side perspective. In this illustrative example, the process detects a park event 541. Here, the vehicle is equipped with a GPS device capable of determining the vehicle coordinates. Once a park event has been detected, the process transmits coordinates of the parked vehicle to a phone or remote server for storage and later retrieval 543. Again, the process is then rendered halted until such time as sound playback is needed.

Once a user requests vehicle-discovery, the process is sent a distance calculation by either the phone or the server 545. In an alternative embodiment, the process can be fed phone coordinates and can perform the distance calculation locally. If the user has not yet met an arrival threshold 547, the process determines if the user is closer 549 or further 553 than when a previous request was received. Since the tones may vary with user proximity, an initial distance can be used to set a baseline rate at which a tone is replayed.

If the user has moved closer to a vehicle, tone playback may be sped up or slowed down 551. Similarly, as the user moves further from the vehicle, the opposite affect may be applied to the tones 555. In this manner, the user can hear the changing rate of playback and know whether a vehicle is being approached or if the user is moving away from the vehicle. If the distance is unchanged (or if an initial distance calculation is received), the process can maintain or establish a baseline tempo 557.

Changing of the rate of play can continue in this manner until the user reaches the vehicle 547, at which time the playback can be appropriately terminated.

Figure 6:
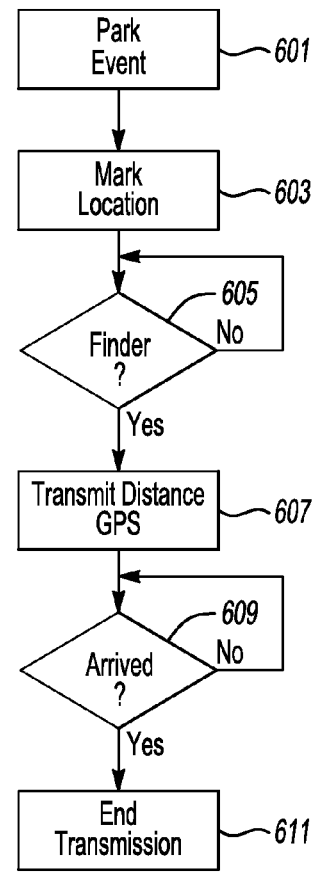
FIG. 6 shows an illustrative example of a fob distance transmission process.

FIG. 6 shows an illustrative example of a fob distance transmission process. In this illustrative example, a key fob has a GPS module provided thereto. The fob can receive coordinates from the vehicle, calculate distances to the vehicle, and transmit distances and/or fob coordinates to the vehicle. Once a park event is detected 601, the vehicle transmits coordinates to the fob, or the fob marks the location of the vehicle in an internal memory 603. In another embodiment, the fob may transmit a location to the vehicle.

Once a finder application has been run on the fob 605, by pressing a button, for example, the fob can either begin determining a distance to the vehicle or transmit GPS coordinates to the vehicle 607. If the fob calculates the distance, the distance may be transmitted to the vehicle for use in frequency of tone playback determination.

Until the fob arrives at the vehicle 609, the process may continue to transmit the distance or GPS coordinates of the fob, so that the vehicle can appropriately vary the sounds.

Once the fob has arrived in suitable proximity to the vehicle 609, the process may end the transmission 611, send a termination command to the vehicle, or take other suitable action to end playback. Unlock commands may be transmitted at certain proximity as well, to provide the user with an unlocked vehicle upon arrival. Similarly, if the fob again moves out of the "unlock proximity," a lock command may be issued.

In another illustrative example, as the user approaches a vehicle, the lights may begin to emit a visual signature. Whether this is simple flashing or a predetermined pattern, this can be useful in additionally helping a user find their vehicle. The visual display may be proximity based, or may persist as long as the audible output persists.

Additionally or alternatively, the volume of the output may change as a user nears a vehicle (or moves away from a vehicle). For example, the volume may decrease as the user approaches the vehicle, so as to minimize disturbance of others. In another example, the volume may increase as a user approaches the vehicle, so as to indicate increasing proximity.

The illustrative embodiments disclosed herein may be practiced between a mobile device and a vehicle directly, or may include a server performing some of the functionality. Further, although not described in detail, it will be understood that a connection between the mobile device and the vehicle and/or server will be established to facilitate communication. This may involve waking the vehicle or "off" state. Multiple connection types are possible, so that, for example, a cellular communication is used to wake a vehicle, and then Wi-Fi/BLUETOOTH are used to perform additional communication, etc.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a vehicle-based processor configured to:
receive a wireless vehicle-locate request from a remote device, including a remote device GPS-location;
receive selection of a user-defined outputtable tone from the remote device;
output, through an external vehicle sound system, the user-defined outputtable tone, wherein the output varies in frequency based on a difference between a vehicle location and the remote device GPS-location; and
cease playback when the difference drops below a predetermined threshold.

2. The system of claim 1, wherein the instruction includes a tone sequence input by the user on the remote device.

3. The system of claim 1, wherein the instruction includes playback of an audio file uploaded to the vehicle from the remote device.

4. The system of claim 1, wherein the instruction corresponds to an audio sequence previously stored on a vehicle memory.

5. The system of claim 1, wherein the processor is further configured to cease playback when a vehicle door is opened.

6. A computer-implemented method comprising:
receiving a wireless vehicle-locate request from a remote device, including a remote device GPS-location;
receiving selection of a user-defined outputtable tone from the remote device;

outputting, through an external vehicle sound systems, the user-defined outputtable tone, the output varying in frequency based on a difference between a vehicle location and the remote device GPS-location; and ceasing playback when the difference between the vehicle location and the remote device GPS-location drops below a threshold.

7. The method of claim 6, wherein the instruction includes a tone sequence input by the user on the remote device.

8. The method of claim 6, wherein the instruction includes playback of an audio file uploaded to the vehicle from the remote device.

9. The method of claim 6, wherein the instruction corresponds to an audio sequence previously stored on a vehicle memory.

10. The method of claim 6, further including ceasing playback when a vehicle door is opened.

11. A non-transitory computer-readable storage medium, storing instruction that, when executed by a processor, cause the processor to perform a method comprising:

receiving a wireless vehicle-locate request from a remote device, including a remote device GPS-location;

receiving selection of a user-defined outputtable tone from the remote device;

outputting, through an external vehicle sound systems, the user-defined outputtable tone, the output varying in frequency based on a difference between a vehicle location and the remote device GPS-location; and ceasing playback when the difference between the vehicle location and the remote device GPS-location drops below a threshold.

12. The storage medium of claim 11, wherein the instruction includes a tone sequence input by the user on the remote device.

13. The storage medium of claim 11, wherein the instruction includes playback of an audio file uploaded to the vehicle from the remote device.

14. The storage medium of claim 11, wherein the instruction corresponds to an audio sequence previously stored on a vehicle memory.

* * * * *